(12) United States Patent
Wakamatu et al.

(10) Patent No.: US 6,419,206 B1
(45) Date of Patent: Jul. 16, 2002

(54) DOOR ATTACHMENT STRUCTURE

(75) Inventors: Hiroshi Wakamatu, Kariya; Yasuhiro Sato, Okazaki, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/924,867

(22) Filed: Aug. 8, 2001

(30) Foreign Application Priority Data

Aug. 25, 2000 (JP) ........................................ 2000-255907
Apr. 19, 2001 (JP) ........................................ 2001-121432

(51) Int. Cl.[7] .............................................. F16K 1/22
(52) U.S. Cl. ..................................................... 251/308
(58) Field of Search .............................. 251/300, 301, 251/305, 308; 454/121, 123

(56) References Cited

U.S. PATENT DOCUMENTS

| | | | |
|---|---|---|---|
| 2,183,292 A | * 12/1939 | Kerentoff | 126/292 |
| 4,506,699 A | 3/1985 | Tschudin-Mahrer | |
| 4,513,771 A | * 4/1985 | Thomas et al. | 137/315.24 |
| 6,030,286 A | * 2/2000 | Kameoka et al. | 415/119 |
| 6,047,951 A | * 4/2000 | Ito et al. | 251/306 |
| 6,209,850 B1 | * 4/2001 | Rafalski | 251/308 |

FOREIGN PATENT DOCUMENTS

| | | |
|---|---|---|
| GB | 2052728 | 1/1981 |
| GB | 2341921 | 3/2000 |
| JP | U-7-23606 | 5/1995 |
| JP | A2000-198342 | 7/2000 |

* cited by examiner

Primary Examiner—Joseph A. Kaufman
Assistant Examiner—Patrick Buechner
(74) Attorney, Agent, or Firm—Harness, Dickey & Pierce, PLC

(57) ABSTRACT

In an attachment structure for attaching a door to a case, plural first ribs and plural second ribs are provided in an inner wall surface defining an attachment hole of the case at different positions shifted from each other in a circumferential direction of the attachment hole. The first ribs and the second ribs protrude from the inner wall surface to an inner radial side in the attachment hole. In addition, each first rib and each second rib are positioned at different position in an axial direction of the attachment hole. Accordingly, when a shaft of the door is inserted into the attachment hole of the case, door attachment performance can be improved.

7 Claims, 3 Drawing Sheets

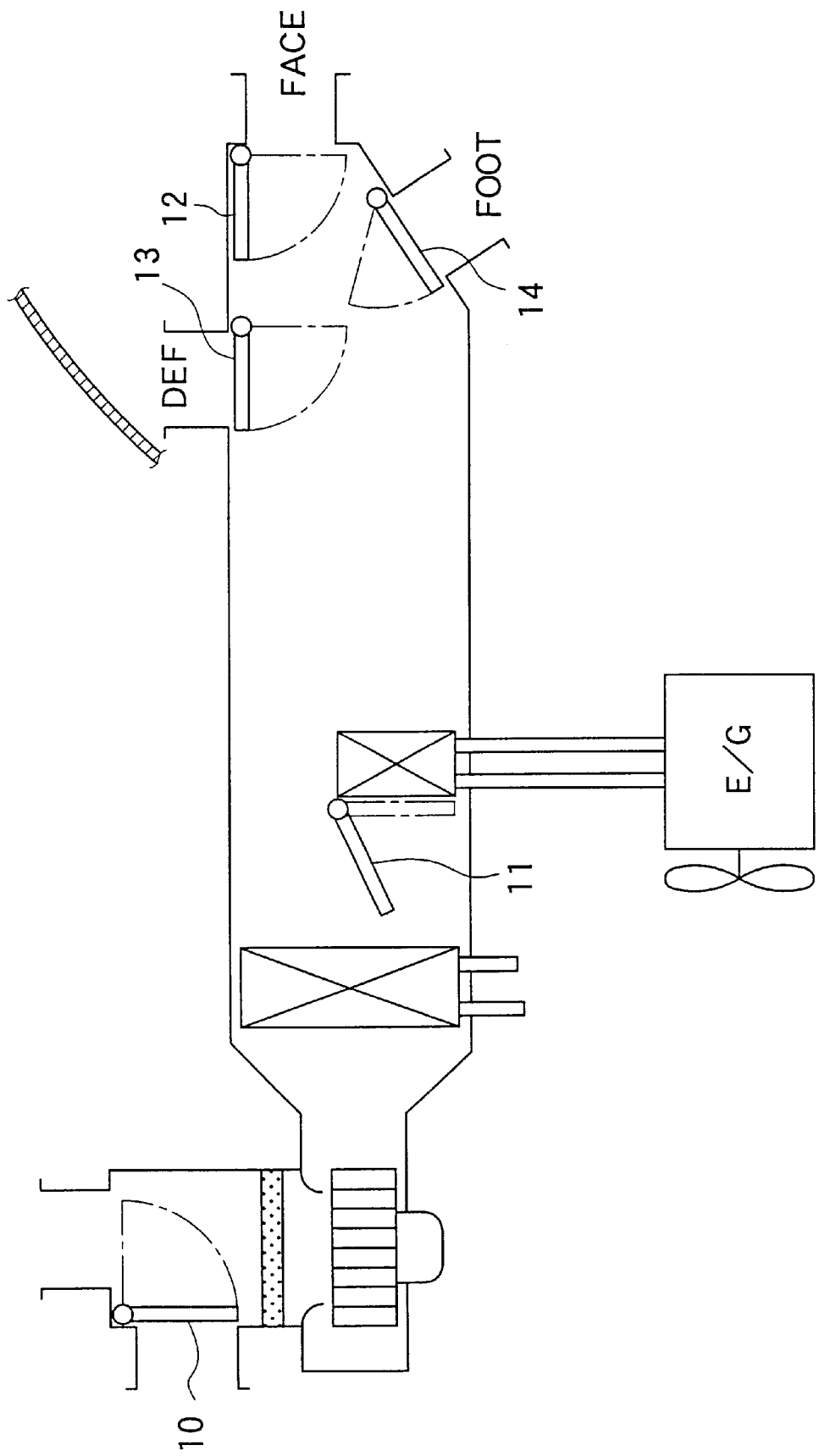

DOOR ATTACHMENT STRUCTURE

CROSS-REFERENCE TO RELATED APPLICATION

This application is related to and claims priority from Japanese Patent Applications No. 2000-255907 filed on Aug. 25, 2000 and No. 2001-121432 filed on Apr. 19, 2001, the contents of which are hereby incorporated by reference.

BACKGROUND OF THE INVENTION

1. Field of the Invention

The present invention relates to an attachment structure of a door for adjusting an air flow. The present invention is suitably used for a vehicle air conditioner.

2. Description of Related Art

In a conventional door attachment structure for a vehicle air conditioner, a shaft is integrated with a flat door, and an end of the shaft is rotatably supported in an attachment hole of a case defining an air passage, so that the air passage is opened and closed by the flat door. Further, plural ribs (generally three), each of which has a triangle cross-section, are formed on an inner wall surface defining the attachment hole to protrude inside, and an outer surface of the door shaft is partially supported by the plural ribs. That is, for reducing the driving force of the door, a contact area between the outer surface of the door shaft and the inner wall surface defining the attachment hole is reduced.

However, for example, when the number of the ribs each having the triangle cross-section is three, the supporting area for supporting the outer surface of the door shaft is small. Therefore, the door shaft may tilt over when being into the attachment hole, and door attachment performance is deteriorated. On the other hand, if the number of the ribs is simply increased, a driving force for driving the door is increased.

SUMMARY OF THE INVENTION

In view of the foregoing problems, it is an object of the present invention to provide a door attachment structure which improves door attachment performance while door driving force is restricted from being increased.

According to the present invention, in a door attachment structure, a plurality of first ribs are provided on a part of an inner wall surface defining an attachment hole, in an axial direction of the attachment hole, to protrude to an outer surface of an insertion portion of the shaft inserted into the attachment hole; and a plurality of second ribs are provided on at least a part portion among the other part of the inner wall surface in the axial direction to protrude to the outer surface of the insertion portion of the shaft. In this attachment structure, the first ribs and the second ribs are positioned to be shifted from each other in a circumferential direction of the attachment hole. Therefore, the insertion portion of the shaft can be supported at points with the summation number of the first and second ribs. Furthermore, since the first and second ribs are shifted from each other in the axial direction, it can accurately prevent the shaft from being tilted in the attachment hole when the door is attached to the case. Therefore, the shaft can be smoothly inserted into the attachment hole, thereby improving attachment performance of the door.

Further, because the first ribs and the second ribs are formed to be separated from each other in the axial direction, each axial length of the first and second ribs is smaller than an entire axial length of the attachment hole. Therefore, when the door is operated, the contact area between the inner wall surface defining the attachment hole and the outer surface of the shaft can be restricted from being increased, and the driving force of the door can be reduced.

BRIEF DESCRIPTION OF THE DRAWINGS

Additional objects and advantages of the present invention will be more readily apparent from the following detailed description of a preferred embodiment when taken together with the accompanying drawings, in which:

FIG. 4 is schematic diagram showing a vehicle air conditioner in which the attachment structure of the door is used, according to the embodiment.

DETAILED DESCRIPTION OF THE PRESENTLY PREFERRED EMBODIMENT

A preferred embodiment of the present invention will be described hereinafter with reference to the accompanying drawings.

Figure 1:
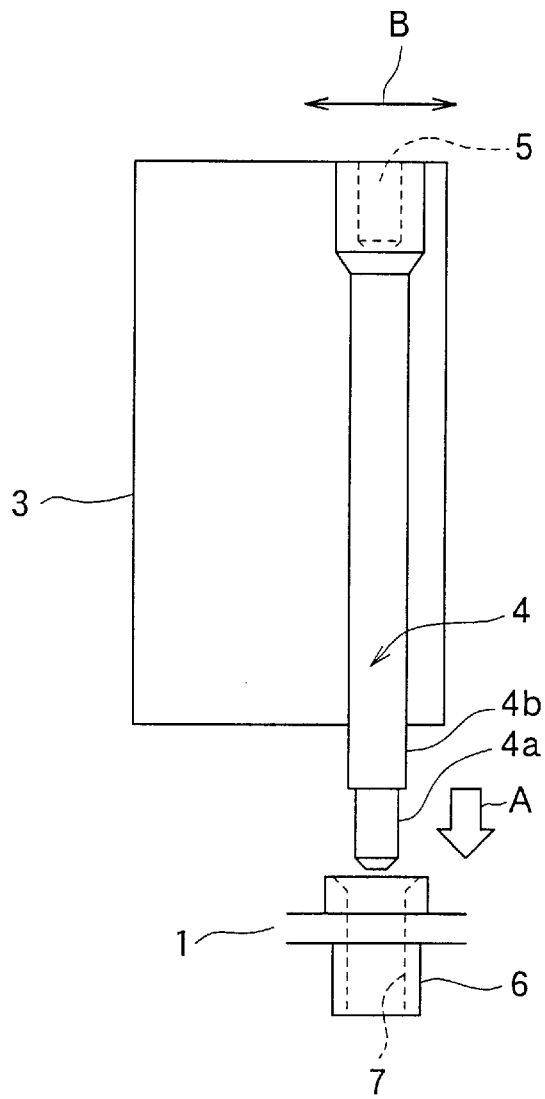
FIG. 1 is a schematic view for explaining an attachment method of a door to a case, according to a preferred embodiment of the present invention.

In this embodiment, a case 1 of a vehicle air conditioner is molded by resin such as polypropylene to define an air passage 2 through which air flows. As shown in FIG. 1, a door 3 used in the vehicle air conditioner has a rectangular plate shape, and is also molded by resin such as polypropylene. The door 3 is integrally provided with-a shaft 4 extending along a longer side surface of the rectangular door 3. The shaft 4 is provided with a recess portion 5 at one end thereof, and a shaft portion of a link member (not shown) for driving the door 3 is connected into the recess portion 5 by press-fitting or the like. The other end of the shaft 4 has a protrusion protruding from the end of the door 3, and the protrusion has a small diameter portion 4a at a tip side thereof and a large diameter portion 4b connected to the small diameter portion 4a.

On the other hand, the case 1 is provided with a cylindrical portion 6 protruding to both inner and outer sides of a wall of the case 1, and the cylindrical portion 6 is provided with an attachment hole 7 into which the protrusion (small diameter portion 4a and large diameter portion 4b) of the shaft 4 is press-fitted.

Figure 2:
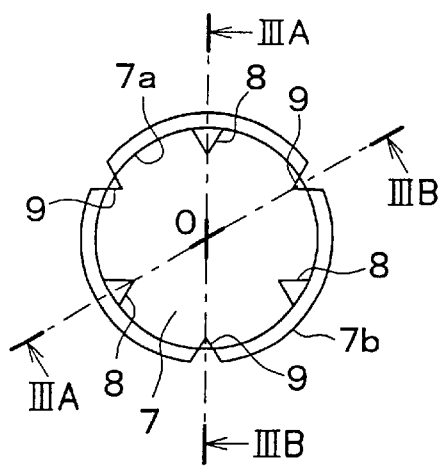
FIG. 2 is a schematic view showing arrangement positions of first ribs and second ribs according to the embodiment.

As shown in FIG. 2, an inner wall surface of the cylindrical portion 6 defining the attachment hole 7 has a small-diameter inner surface 7a at one end in an axial direction, and first ribs 8 are provided to protrude from the small-diameter inner surface 7a to radial inner sides. That is, the first ribs 8 protrude toward the outer surface of the small diameter portion 4a of the shaft 4 inserted into the attachment hole 7. In addition, the inner wall surface of the cylindrical portion 6 defining the attachment hole 7 has a large-diameter inner surface 7b, which has a diameter larger than that of the small-diameter inner surface 7a, at the other end in the axial direction. Second ribs 9 are provided to protrude to radial inner sides from the large-diameter inner surface 7b. That is, the second ribs 9 protrude to the outer surface of the large diameter portion 4b of the shaft 4 when the shaft 4 is inserted into the attachment hole 7.

As shown in FIG. 2, each of the first and second ribs 8, 9 has a triangle cross-section. The three first ribs 8 and the three second ribs 9 are arranged to be offset from each other in a circumferential direction of the attachment hole 7.

More specifically, the three first ribs 8 are arranged at intervals of 120 degrees, and the three second ribs 9 are also arranged at intervals of 120 degrees. In addition, each first rib 8 is arranged at a middle position between adjacent second ribs 9 in the circumferential direction, and each second rib 9 is also arranged at a middle position between adjacent first ribs 8 in the circumferential direction. The second ribs 9 are formed on the large-diameter inner surface 7b along an entire length in an axial direction thereof, as shown in FIGS. 3A and 3B.

Figure 3A:
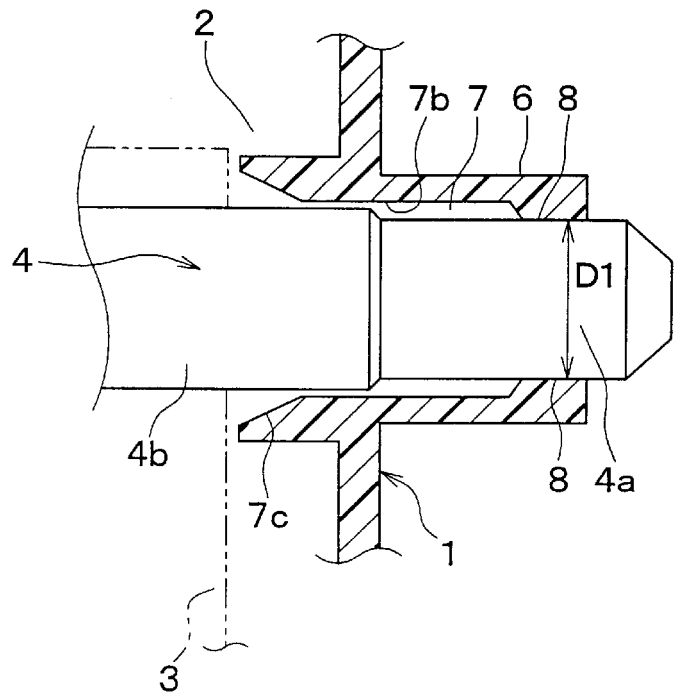
FIG. 3A is a cross-sectional view taken along line IIIA-O-IIIA in FIG. 2.
Figure 3B:
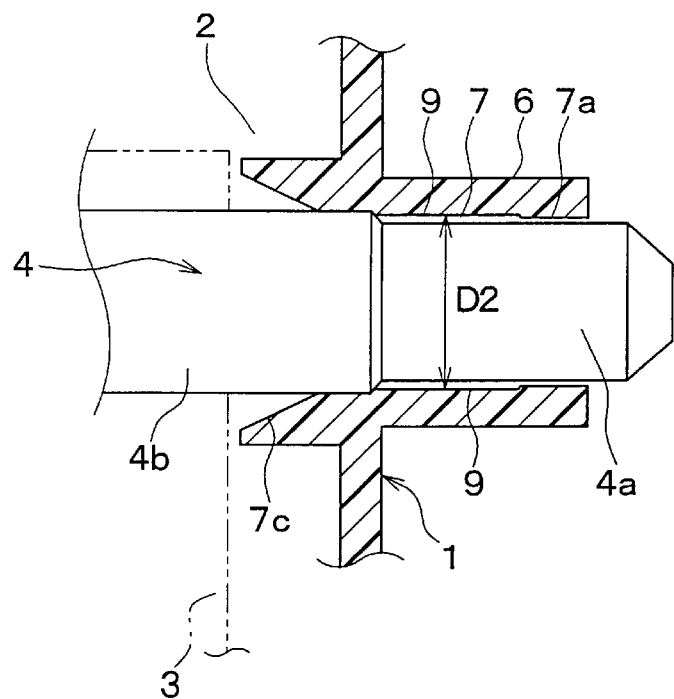
FIG. 3B is a cross-sectional view taken along line IIIB-O-IIIB in FIG. 2, each showing an attachment structure of the door according to the embodiment.

As shown in FIGS. 3A and 3B, an inner radial dimension D1 at the tips of the first ribs 8 is smaller than an inner radial dimension D2 at the tips of the second ribs 9. The inner radial dimension D1 is set slightly smaller than an outer diameter of the small diameter portion 4a, and the inner radial dimension D2 is set slightly smaller than an outer diameter of the large diameter portion 4b. Further, a protrusion height of the first and second ribs 8, 9 is, for example, 0.1 mm. A tapered guide portion 7c for guiding an insertion of the shaft 4 is provided in the cylindrical portion 6 at an inlet side of the attachment hole 7.

Next, an attachment method of the door 3 to the case 1 will be now described with reference to FIG. 1. The protrusion (i.e., small diameter portion 4a and large diameter portion 4b) of the shaft 4 is inserted into the attachment hole 7 of the cylindrical portion 6 of the case 1 in a direction indicated by an arrow A in FIG. 1. Since the three first ribs 8 and the three second ribs 9 are arranged to be shifted (offset) from each other in the circumferential direction, the shaft 4 inserted into the attachment hole 7 is supported substantially at six points in the circumferential direction. Further, since each first rib 8 and each second rib 9 are also shifted from each other in the axial direction of the attachment hole 7, it can accurately prevent the shaft 4 from being inclined.

As a result, the door 3 can be prevented from being inclined in a direction indicated by an arrow B in FIG. 1 when the door 3 is assembled to the case 1, and the protrusion of the shaft 4 can be smoothly inserted into the attachment hole 7, thereby improving the attachment performance of the door 3.

Further, when the shaft 4 is inserted into the attachment hole 7, the small diameter portion 4a positioned at a tip side of the shaft 4 can be firstly inserted within the first ribs 8, and then the large diameter portion 4b can be inserted within the second ribs 9. Accordingly, the small diameter portion 4a and the large diameter portion 4b are not inserted within the first and second ribs 8, 9 at the same time. Therefore, the shaft 4 can be inserted into the attachment hole 7 by a smaller insertion force, thereby furthermore improving the attachment performance of the door 4.

The shaft portion (not shown) of the link member for driving the door 3 is integrally inserted into the recess portion 5 of the shaft 4 through an attachment hole (not shown) of the case 1 by press-fitting or the like.

The first ribs 8 and the second ribs 9 are provided to be separated from each other in the axial direction of the attachment hole 7, respectively. Further, each axial length of the first ribs 8 and each axial length of the second ribs 9 are small and correspond to a part of an entire axial length of the attachment hole 7. Therefore, when the air conditioner is operated, a contact friction area between the inner wall surface of the cylindrical portion 6 defining the attachment hole 7 and the outer surfaces of the small diameter portion 4a and the large diameter 4b of the shaft 4 can be restricted from being increased, and the driving force of the door 3 can be restricted from being increased.

The shaft 4 is formed into a step shape including the tip-side small diameter portion 4a and the large diameter portion 4b connected to the small diameter portion 4a. Further, the inner radial dimension D2 of the tips of the second ribs 9, corresponding to the outer diameter of the large diameter portion 4b, is made larger than the inner radial dimension D1 of the tips of the first ribs 8, corresponding to the outer diameter of the small diameter portion 4a. Therefore, a mold die for molding the case 1 can be readily removed from the case 1 in the left direction in FIGS. 3A and 3B, after the case 1 is molded.

FIG. 4 is a schematic view showing the vehicle air conditioner. As shown in FIG. 4, the vehicle air conditioner includes an inside/outside switching door 10 for selectively opening and closing an air introduction port from which air is introduced, an air mixing door 11 for adjusting temperature of blown air, and mode switching doors (i.e., face door 12, defroster door 13 and foot door 14). The attachment structure of the door 3 described above can be used for any one of the doors 10–14.

Although the present invention has been fully described in connection with the preferred embodiment thereof with reference to the accompanying drawings, it is to be noted that various changes and modifications will become apparent to those skilled in the art.

For example, the number of the first ribs 8 and the number of the second ribs 9 may be two or more than three without being limited to three.

In the above-described embodiment, the protrusion of the shaft 4 to be inserted into the attachment hole 7 can be formed so that the outer diameter of the small diameter portion 4a is equal to that of the large diameter portion 4b. In this case, the inner radial dimension D1 of the tips of the first ribs 8 is made equal to the inner radial dimension D2 of the tips of the second ribs 9. Even in this case, because the first ribs 8 and the second ribs 9 are separated from each other in the axial direction, the door assembling performance can be improved.

Such changes and modifications are to be understood as being within the scope of the present invention as defined by the appended claims.

What is claimed is:

1. An attachment structure of a door, for attaching the door to a case, comprising:

an attachment portion provided in the case, the attachment portion having an inner wall surface defining an attachment hole;

a shaft disposed integrally with the door, the shaft being rotatably inserted into the attachment hole to have an insertion portion inserted into the attachment hole;

a plurality of first ribs provided on a part of the inner wall surface in an axial direction of the attachment hole, the first ribs protruding to an outer surface of the insertion portion of the shaft; and a plurality of second ribs provided on at least a part portion among the other part of the inner wall surface in the axial direction, the second ribs protruding to the outer surface of the insertion portion of the shaft, wherein:

the first ribs and the second ribs are positioned to be shifted from each other in a circumferential direction of the attachment hole.

2. The attachment structure according to claim 1, wherein:

each first rib is arranged substantially at a middle position between adjacent second ribs in the circumferential direction; and each second rib is arranged substantially at a middle position between adjacent first ribs in the circumferential direction.

3. The attachment structure according to claim 1, wherein:

the insertion portion of the shaft has a step shape, including a small diameter portion at a tip side thereof and a large diameter portion connected to the small diameter portion;

the first ribs are provided to correspond to an axial position of the small diameter portion in the axial direction, and the second ribs are provided to correspond to an axial position of the large diameter portion in the axial direction; and an inner radial dimension (D2) at tips of the second ribs is larger than an inner radial dimension (D1) at tips of the first ribs.

4. The attachment structure according to claim 1, wherein each of the first ribs and the second ribs has a triangle cross-section.

5. The attachment structure according to claim 1, wherein:

the door has a substantial rectangular shape enlarged in a predetermined dimension;

the shaft is disposed to be integral with the door on one surface to extend in the predetermined direction; and the insertion potion of the shaft protrudes from an end of the door in the predetermined direction.

6. The attachment structure according to claim 1, wherein:

each first rib is provided in the inner wall surface in a predetermined range in the axial direction; and each second rib is provided in the inner wall surface in a predetermined range in the axial direction at a position different from each first rib in the axial direction.

7. The attachment structure according to claim 1, wherein:

the case defines an air passage through which air flows; and the door is disposed to adjust an air flow in the case.

* * * * *